United States Patent
Andersen (10) Patent No.: US 12,454,418 B2
(45) Date of Patent: Oct. 28, 2025

(54) FIXED RADIUS CONVEYOR BELT SYSTEM

(71) Applicant: Ammega Group AG, Steinhausen (CH)

(72) Inventor: Kenneth Westergaard Andersen, Vejle (DK)

(73) Assignee: Ammega Group AG, Steinhausen (CH)

( * ) Notice: Subject to any disclaimer, the term of this patent is extended or adjusted under 35 U.S.C. 154(b) by 107 days.

(21) Appl. No.: 18/578,764

(22) PCT Filed: Jul. 13, 2022

(86) PCT No.: PCT/DK2022/050158
§ 371 (c)(1),
(2) Date: Jan. 12, 2024

(87) PCT Pub. No.: WO2023/284927
PCT Pub. Date: Jan. 19, 2023

(65) Prior Publication Data
US 2024/0383688 A1    Nov. 21, 2024

(30) Foreign Application Priority Data

Jul. 15, 2021    (DK) .......................... PA 2021 70379

(51) Int. Cl.
*B65G 17/08*    (2006.01)
*B65G 17/40*    (2006.01)

(52) U.S. Cl.
CPC ........... *B65G 17/086* (2013.01); *B65G 17/40* (2013.01)

(58) Field of Classification Search
CPC .. B65G 17/086; B65G 2207/32; B65G 17/40; B65G 2207/30; B65G 2812/02376
(Continued)

(56) References Cited

U.S. PATENT DOCUMENTS

| 3,785,476 A | 1/1974 | Poerink |
| 3,939,964 A | 2/1976 | Poerink |

(Continued)

FOREIGN PATENT DOCUMENTS

| EP | 0 560 480 A2 | 9/1993 |
| EP | 0 560 480 A3 | 9/1993 |

(Continued)

OTHER PUBLICATIONS

International Search Report & Written Opinion for PCT/DK2022/050158 mailed on Oct. 18, 2022.
(Continued)

*Primary Examiner* — Mark A Deuble
(74) *Attorney, Agent, or Firm* — Schmeiser, Olsen & Watts, LLP (57) ABSTRACT

A fixed radius conveyor belt system of the type assembled from a plurality of substantially identical belt modules is provided. The fixed radius conveyor belt system is assembled from a plurality of belt modules, each having a leading edge and a trailing edge, and an inner side and an outer side and with a modular belt body between therebetween, and where a plurality of eye parts extend from the leading and trailing edges and are off-set on one edge relative to the other edge, such that two adjacent like modular belt links are pushed together. The leading edge and the trailing edge are arranged with a mutual angle β, such that an axis through the leading axis will intercept an axis through the trailing edge in a turning center, such that eye parts further away from the turning center will have curved sides following ever larger circle radiuses.

11 Claims, 4 Drawing Sheets

(58) Field of Classification Search
USPC .................................................. 198/851–853
See application file for complete search history.

(56) References Cited

U.S. PATENT DOCUMENTS

| | | | |
|---|---|---|---|
| 5,921,379 A | 7/1999 | Horton | |
| 6,036,001 A * | 3/2000 | Stebnicki | B65G 17/086 |
| | | | 198/852 |
| 6,330,941 B1 * | 12/2001 | Guldenfels | B65G 17/08 |
| | | | 198/853 |
| 6,347,699 B1 * | 2/2002 | Ramsey | B65G 17/44 |
| | | | 198/852 |
| 6,672,451 B1 * | 1/2004 | Thompson, Jr. | B65G 17/086 |
| | | | 198/852 |
| 7,293,644 B2 * | 11/2007 | Stebnicki | B65G 17/086 |
| | | | 198/853 |
| 7,377,380 B2 * | 5/2008 | Menke | B65G 17/06 |
| | | | 198/852 |
| 9,254,962 B2 * | 2/2016 | Studer | B65G 17/066 |
| 9,434,546 B2 | 9/2016 | Cornelissen et al. | |
| 2007/0175736 A1 * | 8/2007 | Bickel, Jr. | B65G 17/086 |
| | | | 198/778 |
| 2014/0231226 A1 | 8/2014 | Sharma et al. | |
| 2016/0060041 A1 * | 3/2016 | Miller | B65G 17/086 |
| | | | 198/853 |
| 2024/0278995 A1 * | 8/2024 | Ferlini | B65G 17/086 |

FOREIGN PATENT DOCUMENTS

| | | | |
|---|---|---|---|
| EP | 1680342 A1 | 7/2006 | |
| EP | 3 543 178 A1 | 9/2019 | |
| NL | 2014490 A | 10/2016 | |
| WO | 99/50160 A1 | 10/1999 | |
| WO | WO-2004058603 A1 * | 7/2004 | ............. B65G 17/40 |

OTHER PUBLICATIONS

Danish Search Report for Application No. PA 2021 70379 completed on Jan. 10, 2022.

* cited by examiner

FIXED RADIUS CONVEYOR BELT SYSTEM

CROSS-REFERENCE TO RELATED APPLICATIONS

This application claims priority to PCT Application No. PCT/DK2022/050158, having a filing date of Jul. 13, 2022, which is based on DK Application No. PA 2021 70379, having a filing date of Jul. 15, 2021, the entire contents both of which are hereby incorporated by reference.

FIELD OF TECHNOLOGY

The following is directed to a fixed radius conveyor belt system of the type assembled from a plurality of substantially identical belt modules.

BACKGROUND

In the conventional art of conveyor belts and particularly conveyor belts assembled from substantially identical conveyor belts modules there is the traditional straight conveyor belts where each belt module is assembled with the adjacent belt module by overlapping eye parts and where eye parts are provided with a lateral aperture. By inserting a connection pen through overlapping apertures on adjacent belt modules a conveyor belt may be assembled which is bendable orthogonal to the plane of the conveyor belt. Likewise, it is known to provide side flexing conveyor belts where the apertures in the eye parts at least in one set of eye parts along one edge of the conveyor belt module has a longitudinal extend in the intended travelling direction of the conveyor belt. In this manner it becomes possible for the connection pin to move in the aperture and thereby facilitate the adjacent conveyor belt module to slightly be displaced relative to the other adjacent conveyor belt modules. In this manner the conveyor belt is in addition to be pivotable in a plane orthogonal to the transport direction also be able to turn to either side in a plane parallel to the intended transport direction.

SUMMARY

An aspect relates to a special type of conveyor belt, namely a conveyor belt having a fixed radius such that adjacent conveyor belt modules will not be displaced relative to each other but stay in firm engagement. These types of fixed radius conveyor belts are used in conveying structures where it is desirable for example to have the conveying path go through a 90° turn (also other degrees of turns may be contemplated). In these instances, it is desirable to provide a conveying structure which has limited wear and tear in order to provide a long surface life and at the same time to minimize the noise as the plurality of modular belt links travel along the curved conveying path.

Embodiments of the present invention address this by providing a fixed radius conveyor belt system where the conveyor belt system is assembled from a plurality of belt modules, where each belt module comprises a leading edge and a trailing edge, and an inner side and an outer side and with a modular belt body between the leading edge, trailing edge, outer side and inner side, and where a plurality of eye parts extend from the leading and trailing edges, where the eye parts are off-set on one edge relative to the other edge, such that when two adjacent like modular belt links are pushed together, the eye parts on a trailing edge will inter-fit between eye parts on a leading edge and were apertures are provided in the eye parts, the apertures arranged along an axis parallel to the leading edge or the trailing edge, and where the leading edge and the trailing edge are arranged with a mutual angle $\beta$, such that an axis through the leading axis will intercept an axis through the trailing edge in a turning center, and where the eye parts are defined by two sides extending from the leading edge or trailing edge, and a distal end connecting the two sides, where a first side of an eye part closest to the turning center is curved following a first radius and the other side of the eye part is curved following a second radius larger than the first radius, such that eye parts further away from the turning center will have curved sides following ever larger circle radiuses.

One of the challenges when making a conveyor belt and in particular conveyor belts which are to be used in public spaces is the fact that conveyor belts built by a large plurality of substantially identical belt modules have a tendency to rattle or make more noise. Therefore, conveyor belts made from a continuous cloth or belt material have been used in many such applications, as the noise issue hitherto has been substantially less.

However, with embodiments of the present invention and particularly when assembling a number of relatively small size modules where the manner of assembling adjacent belt modules is by intermeshing eye parts and inserting a lateral pin in order to connect adjacent eye parts has proven to be successful, particularly by the fact that the eye parts are also made with a curved design such that they follow the radius at which they are present relative to the turning point. This in turn creates a somewhat more expensive molding system as each module laterally in such a construction requires its own mold which shall also be very precisely designed as when intermeshing eye parts having curvatures they need to be absolutely intermeshed with eye parts having as similar curvature in order to be able to flex and run smoothly and thereby minimizing the generation of noise and in the long term also wear and tear.

In an embodiment of the invention, the width of the conveyor belt, from the inner side closest to the turning center to the outer side furthest from the turning center is assembled from two or more belt modules, and where a tap extends from either the inner side or the outer side of a first belt module and where adjacent the inner side or outer side on an adjacent second modular belt link to be arranged radially next to the first modular belt link is provided a receiving cavity which in use will accommodate part of the tap The provision of a tap and a receiving aperture in an adjacent side, laterally from the turning point provides that it is possible to click/assemble adjacent conveyor belt modules together laterally such that there is a detachable connection between the adjacent conveyor belt modules. As the conveyor belts in this direction i.e. laterally following a radial, the engagement between the adjacent side surfaces of adjacent belt modules is minimized and as such any noise arising from this engagement is also minimized.

In an embodiment of the invention, each belt module on the underside adjacent the inner and the outer side is provided with reinforcement ribs, such that one or more reinforcement ribs connects eye parts along the leading edge with eye parts along the trailing edge.

In the position, the reinforcement webs in the underside will typically be designed such that this is where sprocket wheels from the drive rollers in the sub construction will engage and propel the conveyor belt. Furthermore, the edge parts of conveyor belts are usually put under more strain and stress than the center part and by simply providing reinforcement webs only alongside parts of the conveyor belts is achieved a weight reduction in the middle and therefore less propulsion power is needed in order to propel the belt but at the same time the structure and integrity and strength of a conveyor belt is achieved. This will be evident from embodiments of the invention described with respect to the sub structure, the sprocket wheels will engage the underside of the conveyor belt where the sprocket wheels particularly will engage between adjacent reinforcement ribs whereby the propulsion force is transmitted from the sprocket wheel to the side limitations of the conveyor belt and therefrom to the entire modular belt module body. In this manner the material from which the modular belt module is manufactured is utilized in the best possible manner.

In an embodiment of the invention, the conveyor belt width orthogonal to the intended travelling direction is assembled from a plurality of different modular belt links, where the trailing and leading edges are parallel to different radials for the entire conveyor belts width, and where the distance in the travelling direction between the trailing edge and the leading edge diverges, such that the distance between the leading and trailing edge increases the further from the turning center the two edges are.

It is clear that as the modules are to be fitted further and further away from the turning center, the radius for which they must be designed must also be larger and larger. Likewise, the distance between the leading and trailing edge must increase the further it is distanced from the turning center.

In an embodiment of the invention, the modular belt link closest to the turning center has an inner edge following a radius of 1000 mm, the laterally adjacent belt modules inner most edge follows radiuses increasing by 200 mm for each consecutive modular belt link further removed from the turning center.

For practical purposes tests have indicated that conveyor belts having a minimum turning radius of 1000 mm are applicable to most applications and at the same time provides the strength, stability, and very low noise in order to be implemented successfully. By furthermore creating steps of 200 mm per lateral module starting from the 1000 mm turning radius, it is achieved that the width of the module belt length may be a constructive in steps of 200 mm which steps are large enough that substantially limited amount of different belt modules are needed in order to create the desired conveyor belt width. For most applications where a fixed radio belt comes into consideration this stepwise availability of belt modules which at the same time represents a limiting the number of different modular belt modules, also necessitates that the number of molds as well as the amount of modules which need to be kept in stock may be limited.

In an embodiment of the invention, the mutual angle β between the leading edge and the trailing edge is between 0.5° and 1.2°, between 0.6° and 0.75°, and or is selected at 0.65°. By providing that each module has this very limited angle span between its leading and trailing edges it is foreseen that a relatively large number of modular belt modules must be used in the longitudinal direction of the conveyor belt but on the other hand it becomes possible to turn the assembled conveyor belt around a tighter turn meaning a smaller radius of the drive rollers which are used in the event of a conveyor belt of this type. As this facilitates a relatively low construction height and at the same time since modules in each lateral row are identical, extra molding costs or storage costs do not arise as it is the same identical modules which are used, but in a large number in a conveyor belt construction. Furthermore, the relatively low construction height allows conveyors of this type with modular belt modules as described above to be built into already existing constructions without substantial reconstruction needed of the structure as such.

Embodiments of the invention relating to the fixed radius conveyor belt system in a also disclose that the modular conveyor belt is carried by a substructure where the substructure comprises:

a. A carrying frame, designed to carry the loads the conveyor belt may be exposed to, and curved to follow the intended transport path of the conveyor belt, the carrying structure having a number of radially arranged support beams:

b. A number of substantially part-circular low friction carrying and sliding rails, arranged with different radius' relative to the turning center:

c. A drive axle radially arranged in one end of the substructure, where the drive axle is provided with at least one sprocket wheel for drivingly engagement with the underside of the conveyor belt, and where the drive axle is in driving engagement with a propulsion, and the drive axle rotates about an axis arranged radially with respect to the turning center:

d. A rotating axle in the opposite end of the substructure to the drive axle, where the rotating axle is provided with at least one sprocket wheel for engagement with the underside of the conveyor belt and where the rotating axle rotates about an axis arranged radially with respect to the turning center.

As the modular belt modules are substantially self-bearing between the inner side and the outer side, it is not necessary to provide a laterally continuous support in the substructure underneath the modular belt modules. By having discrete low friction carrying and sliding rails arranged as concentric parts of circles underneath the conveying path is achieved that as little as possible engagement between the moving belt modules and the substructure occurs. This has one great advantage in that the noise generated by the belt modules sliding along the support rails is reduced and at the same time due to the inherent strength of the belt modules, the substructure is lighter and simple to construct as the belt modules will be able to carry the load laterally.

In an embodiment, the drive axel, and the rotating axel between the sprocket wheels or on either side of the sprocket wheel are provided with a resilient padding. The resilient padding provides a number of advantages, where the two main advantages is the fact that when the conveyor belt engages the drive axel and the rotating axel, the resilient padding will dampen the noise generation thereby further reduce the noise generated by these types of conveyors. Secondly, the resilient padding accommodates the underside of the conveyor belt modules and as such carries more or less evenly distributed load across the drive axel and at the same time a relatively high friction may be caused between the resilient padding and the underside of the conveyor belts whereby the load from the rotating drive axel particularly, is not just transmitted by the sprocket wheels but also transmitted by the resilient padding. In this manner a more even distribution of the power and therefore a more even distribution of the load across the entire conveyor belt is achieved.

In an embodiment of the invention, the drive axel and the rotating axel are conically shaped, such that the diameter of the axles closest to the turning center is smaller than the diameter of the axles furthest away from the turning center. The design of the axels having a smaller diameter closest to the turning center and a larger diameter furthers away from the turning center also helps in keeping the belt nice and tight and at the same time for even force distribution from the axel/sprocket wheels to the modular conveyor belt structure.

In an embodiment, the mutual angle between the axis of the drive and rotating axles is between 15° and 120°. The mutual angle between the rotating axel and the drive axel does define the turning angle which the conveyor goes through, such that for example if the angle between these two axels is 90° the conveyor belt will transport items on surface through a 90° angle. In theory the axels may be more or less parallel as such that the conveyor belt almost travels an entire circle. The circle is however broken by the space needed for the conveyor belt modules to turn around the drive axel and the rotating axel in close proximity. However, for most practical purposes the turning angle is between 45° and 120°.

BRIEF DESCRIPTION

Some of the embodiments will be described in detail, with references to the following Figures, wherein like designations denote like members, wherein.

DETAILED DESCRIPTION

Figure 1:
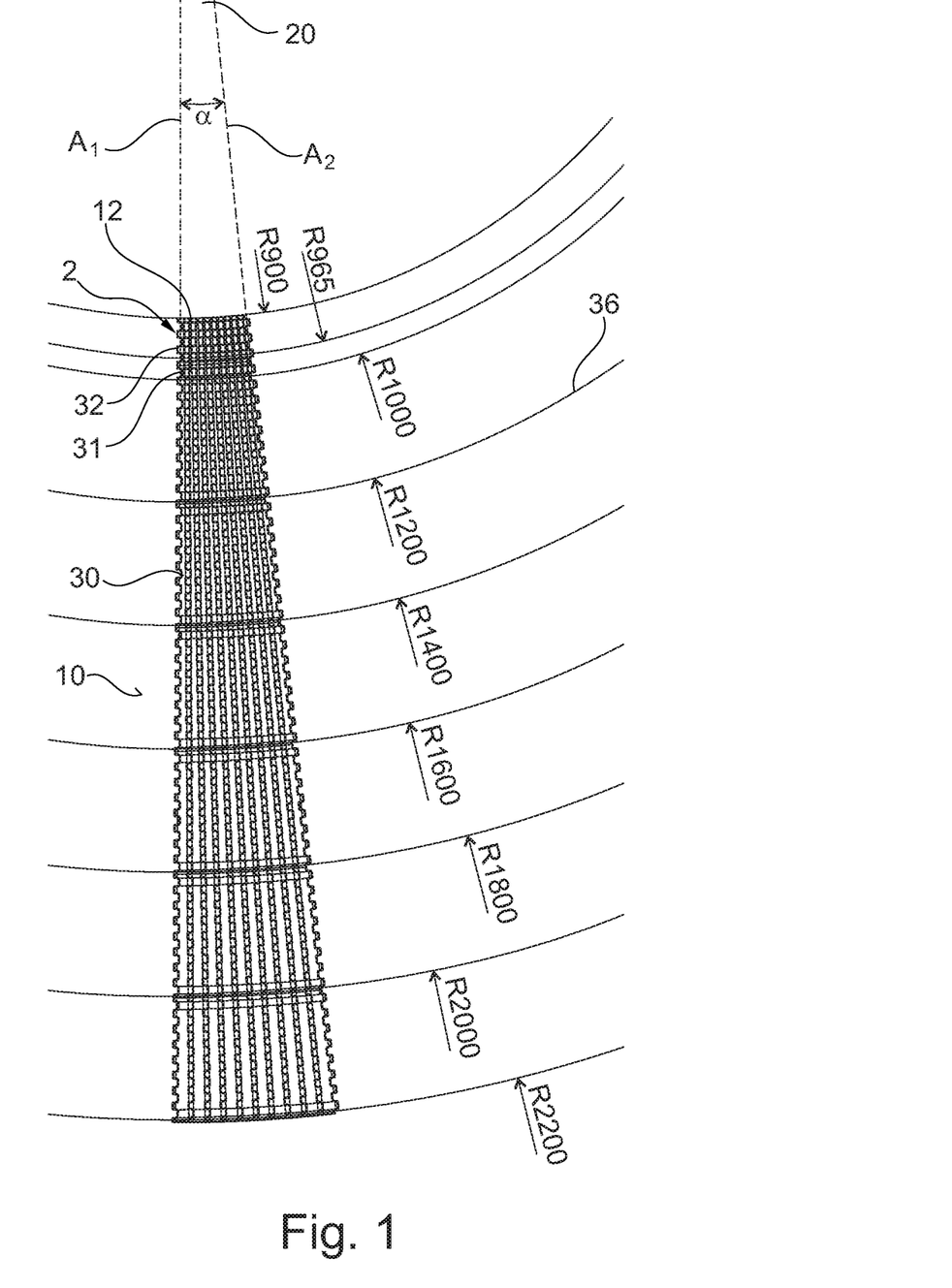
FIG. 1. illustrates a section of a modular conveyor belt according to embodiments of the present invention.

In FIG. 1 is illustrated a section of a modular conveyor belt according to embodiments of the present invention. The modular conveyor belt section is in this embodiment made of 8 different belt modules arranged laterally. In this embodiment the innermost belt module 2 has an inner side 12 following a radius of 900 mm relative to the turning point 20. The turning point or center of a circle 20, is where axis a1, a2 intersect.

Figure 2:
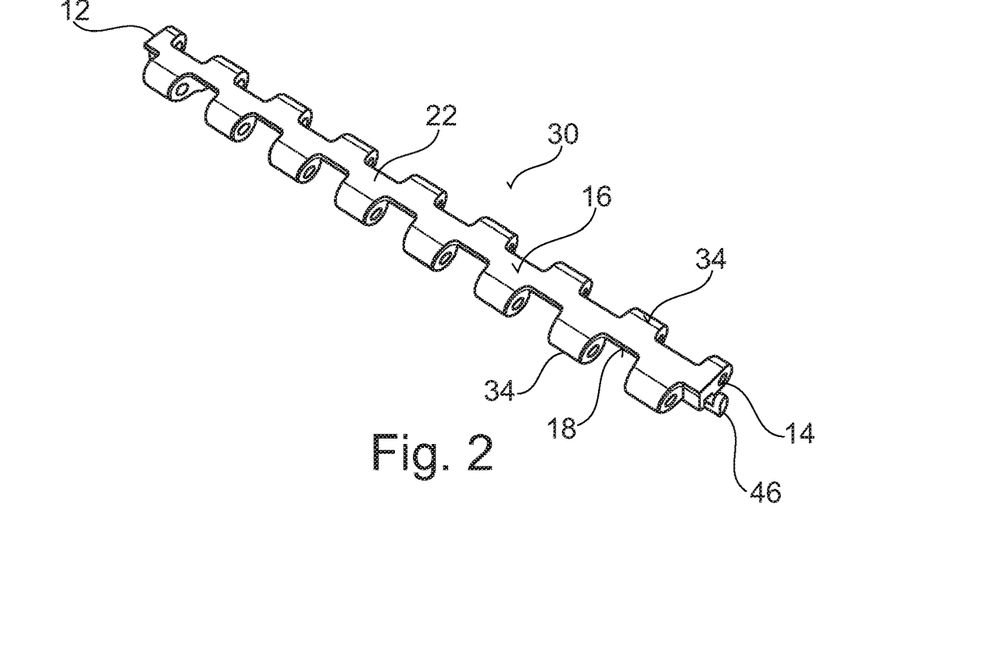
FIG. 2 illustrates a single belt module seen from above and below.

Each modular belt link, see FIG. 2, is provided with an inner side 12 and an outer side 14. Both the inner side 12 and the outer side 14 follow respective radiuses such that for example if the modular belt link 30 is arranged as number 4 radially (see FIG. 1), the inner radius will correspond to 1200 mm from the turning point 20, whereas the outer radius and thereby the outer side 14 will be curved corresponding to having a radius of 1400 mm with respect to the turning point. The next consecutive belt module having a larger radius will have an inner radius of 1400 mm and an outer radius of 1600 mm and so forth.

Furthermore, the modular belt link 30 is provided with a leading edge 16 and a trailing edge 18. Due to the angle of relationship between the leading edge 16 and the trailing edge 18, as illustrated with reference to FIG. 1 where it is clear that the axis a1, a2 are angled at certain angle α, this will cause the distance between the leading edge 16 and the trailing edge 18 closer to the inner side 12, will be smaller than the same distance measured closer to the outer side 14. The part of the module defined by the leading edge 16, the trailing edge 18, the inner side 12 and the outer side 14, may be called the belt body 22. The belt body's geometrical shape may be called a truncated wedge in that it does have a substantially wedge-shaped design, but it does not have the pointed end, which is normal for a wedge. In theory an innermost module having a zero radius with respect to the turning point will have a wedge shape.

In the embodiment illustrated in FIG. 1, the stepwise separation of the width of the conveyor belt is here selected at 200 mm for the majority of the belt modules making up the section 10. For special purposes additional belt modules 31, 32 may be added closer to the turning center in order to provide a conveying surface having a larger extend in this direction. However, by manufacturing the lateral length, i.e. the distance between the inner side and the outer side of the modular belt length 30 such that they have a fixed measurement, for example, as illustrated in FIG. 1, 200 mm, it is possible to build in a standardized manner, fixed radius turning modular conveyor belts having a wide variety of lateral widths just by assembling a number of belt lengths having different/consecutive turning radiuses 36.

Figure 3:
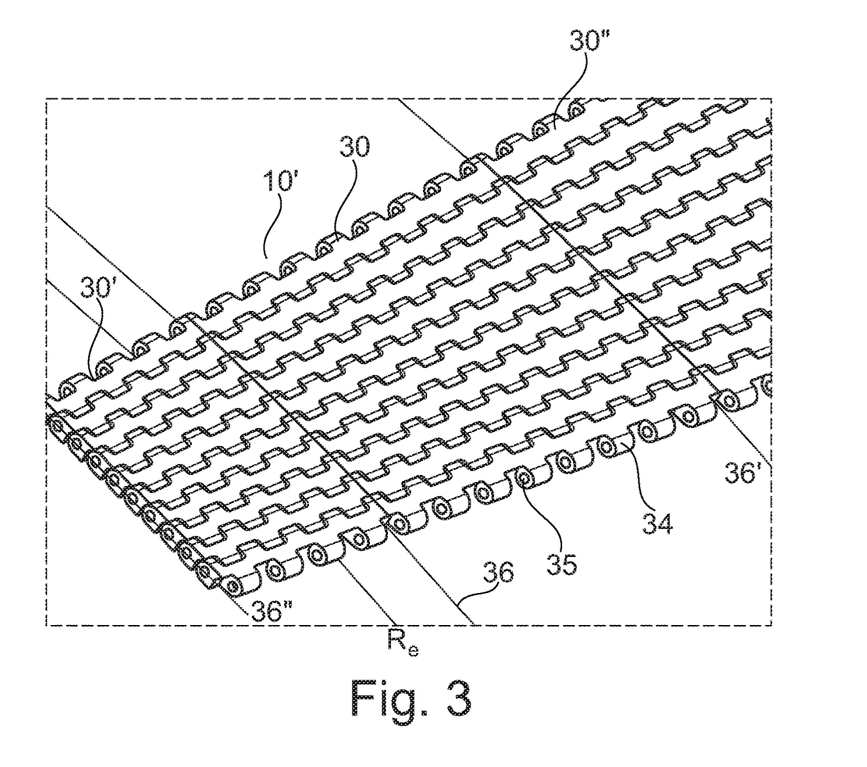
FIG. 3 illustrates a section of a fixed radius conveyor seen from below and from above.

Turning back to FIG. 2, the modular belt length 30, has eye parts 34 projecting from the leading respective trailing edged, 16,18. The eye parts 34 are offset laterally such that eye parts on one side may be inter fitted between eye parts on the opposite side. In this manner it is possible to assemble a substantially continuous modular conveyor belt surface as illustrated in FIG. 3. However, it is also contemplated that the belt body may be perforated or otherwise not continuous.

Figure 4:
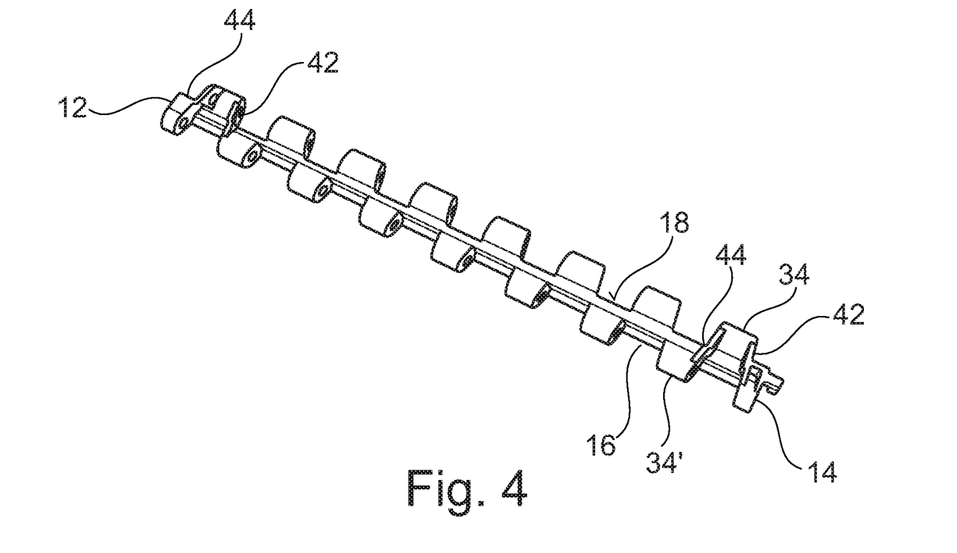
FIG. 4 illustrates a single belt module seen from above and below.

Turning to FIG. 4, the belt link illustrated in FIG. 2 is seen from the underside. From the underside may be seen that reinforcement ribs 42,44 are arranged connecting eye parts 34,34' on either edge 16,18 of the modular belt link 30. The position where the reinforcement ribs 42,44 are provided will typically be the positions in which a sprocket wheel, see in this connection FIG. 6, will engage, and propel the conveyor belt.

The modular belt 30 is furthermore provided with a tap 46 projecting from either the inner side 12 or the outer side 14. In the embodiment illustrated in FIGS. 2 and 4, the tap 46 projects from the outer side 14. The tap is arranged such that it will engage an adjacent belt link's inner side 12 and in this manner couple two adjacent belt links together. In this manner, mutual movement between adjacent belt links is minimized and thereby the generation of noise and wear is also minimized. Noise is an important factor when deciding what type of conveyor belt to implement in various applications and by being able to reduce the noise generation of this modular belt link construction considerably, the construction may be contemplated for a number of applications which hitherto has not been considered when thinking in terms of modular conveyors assembled from modular belt links.

Turning back to FIG. 3 it may be seen a section of an assembled conveyor belt 10', where in this embodiment a number of modular belt links, 30, 30', 30" are indicated. Each separate modular belt link, 30, 30', 30", is laterally limited by the indicated radiuses 36", 36 and 36'. This section corresponds to a sectional view in FIG. 1. As may be seen, the eye part 34 are intermeshed such that a connection pin (not illustrated) may be inserted through the apertures 35, having through-going apertures parallel to the axis a1, a2.

The eye parts themselves are designed such that they also follow a radius $R_e$. In this manner the engagement between adjacent eye parts when the modular belt modules are assembled such as illustrated in FIGS. 1 and 3 foresees that due to designing the eye parts 34 along a radius $R_e$ instead of a straight line, the interference between adjacent eye parts will be minimized causing less noise and less tear and wear.

Figure 5:
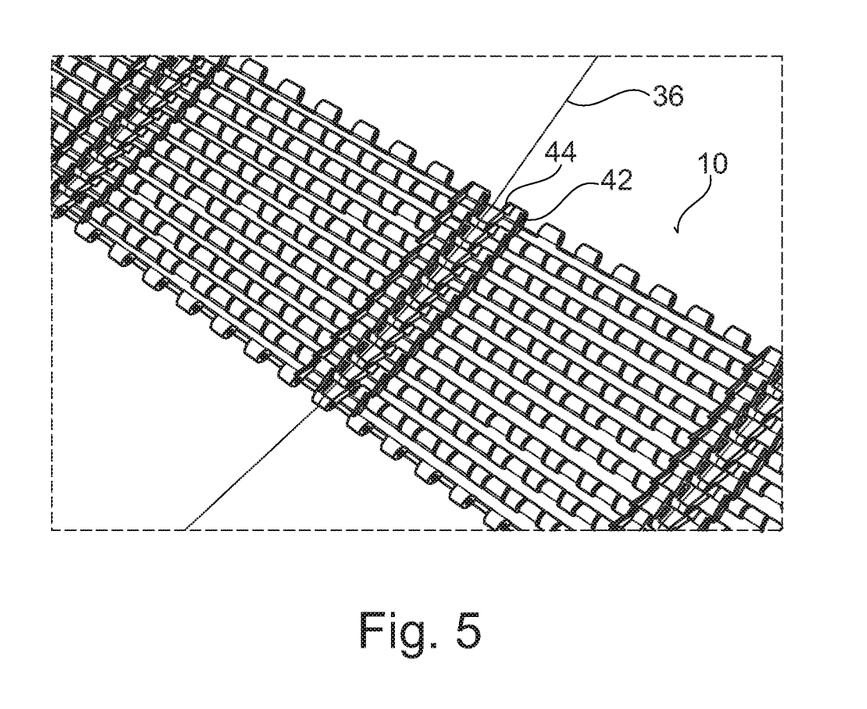
FIG. 5 illustrates a section of a fixed radius conveyor seen from below and from above.

Turning to FIG. 5, the underside of the conveyor belt section 10 is illustrated with reference to FIG. 3. At the reinforcement ribs, 42, 44 this embodiment clearly indicates a reinforced "lane" in the conveyor belt where extra strength is provided in a belt such that power from for example the sprocket wheel mounted on the driver axels may be transferred to the conveyor belt in these "lanes".

Figure 6:
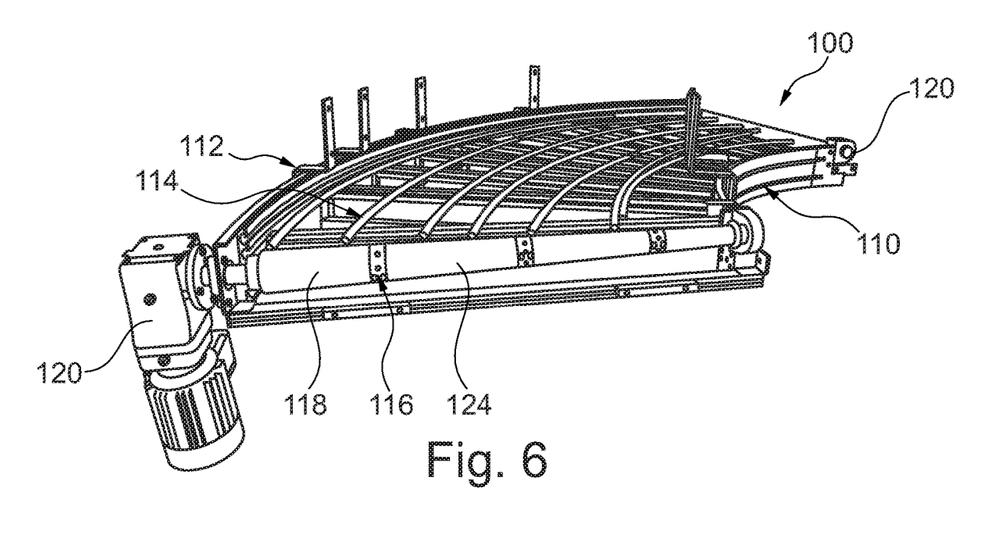
FIG. 6 illustrates an example of a substructure for a fixed radius conveyor belt.

Turning to FIG. 6, a carrying structure 100 is illustrated. The carrying structure comprises side limitations 110, 112 provided to guide the conveyor belt and in particular objects carried on the conveyor belt through the turn.

In either end of the substructure 100 is arranged axles 118,120 on which sprocket wheels 116 are arranged. One axle 118 is connected to a motor 122, providing power, by turning the axle 118 thereby propelling a conveyor belt (not illustrated) along the conveying path. In the opposite end is likewise arranged a non-powered axle 120 with or without sprocket wheels in order to allow turning of the modular conveyor belt, and if provided with sprocket wheels also guide the tracking of the conveyor belt.

Between the sprocket wheels 116 is arranged a resilient layer 124 which partly serves to dampen the noise when the modular belt links passes and is being turned around the axles 118,120, but also resiliently supports and by friction engages the modular belt links assisting in propelling the conveyor belt.

In order to support the conveyor belt along the transport path, a number of rails 114 are provided. The rails are provided with low friction surfaces where engaging the underside of the conveyor belt to lessen noise generation and power consumption. The guiderails also follow radiuses corresponding to their distance to the turning center.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A fixed radius conveyor belt system, where the conveyor belt is assembled from a plurality of belt modules, where each belt module comprises a leading edge and a trailing edge, and an inner side and an outer side and with a modular belt body between the leading edge, trailing edge, outer side and inner side, and where a plurality of eye parts extend from the leading and trailing edges, where the eye parts are off-set on one edge relative to the other edge, such that when two adjacent like modular belt modules are pushed together, the eye parts on a trailing edge will inter-fit between eye parts on a leading edge and were apertures are provided in the eye parts, the apertures arranged along an axis parallel to the leading edge or the trailing edge, wherein the leading edge and the trailing edge are arranged with a mutual angle α, such that an axis parallel and through the leading edge will intercept an axis through and parallel to the trailing edge in a turning center, and where the eye parts are defined by two sides extending from the leading edge or trailing edge, and a distal end connecting the two sides, where a first side of an eye part closest to the turning center is curved following a first radius and the other side of the eye part is curved following a second radius larger than the first radius, such that eye parts further away from the turning center will have curved sides following ever larger circle radiuses.

2. The fixed radius conveyor belt system according to claim 1, wherein the width of the conveyor belt, from the inner side closest to the turning center to the outer side furthest from the turning center is assembled from two or more belt modules, and where a tap extends from either the inner side or the outer side of a first belt module and where adjacent the inner side or outer side on an adjacent second modular belt link to be arranged radially next to the first modular belt link is provided a receiving cavity which in use will accommodate part of the tap.

3. The fixed radius conveyor belt system according to claim 1, wherein each belt module on the underside adjacent the inner and the outer side is provided with reinforcement ribs, such that one or more reinforcement ribs connects eye parts along the leading edge with eye parts along the trailing edge.

4. The fixed radius conveyor belt system according to claim 1, wherein the conveyor belts' width orthogonal to the intended travelling direction is assembled from a plurality of different modular belt modules, where the trailing and leading edges are parallel to different radials for the entire conveyor belts width, and where the distance in the travelling direction between the trailing edge and the leading edge diverges, such that the distance between the leading and trailing edge increases the further from the turning center the two edges are.

5. The fixed radius conveyor belt system according to claim 4, wherein the modular belt module closest to the turning center has an inner edge following a radius of 1000 mm, the laterally adjacent belt modules inner most edge follows radiuses increasing by 200 mm for each consecutive modular belt link further removed from the turning center.

6. The fixed radius conveyor belt system according to claim 5, wherein on the inside of the belt module having an inner side following a radius of 1000 mm one or more special belt modules may be arranged.

7. The fixed radius conveyor belt system according to claim 1, wherein the mutual angle α between the leading edge and the trailing edge is selected from between 0.5° and 1.2°, between 0.6° and 0.75°, and at 0.65°.

8. The fixed radius conveyor belt system according to claim 1, wherein the modular conveyor belt is carried by a substructure, wherein the sub-structure comprises:
   a. a carrying frame, configured to carry the loads the conveyor belt may be exposed to, and curved to follow the intended transport path of the conveyor belt, the carrying structure having a number of radially arranged support beams:
   b. a number of substantially part-circular low friction carrying and sliding rails, arranged with different radius' relative to the turning center;
   c. a drive axle radially arranged in one end of the substructure, where the drive axle is provided with at least one sprocket wheel for drivingly engagement with the underside of the conveyor belt, and where the drive axle is in driving engagement with a propulsion, and the drive axle rotates about an axis arranged radially with respect to the turning center; and
   d. a rotating axle in the opposite end of the substructure to the drive axle, where the rotating axle is provided with at least one sprocket wheel for engagement with the underside of the conveyor belt and where the rotating axle rotates about an axis arranged radially with respect to the turning center.

9. The fixed radius conveyor belt system according to claim 8, wherein the drive axle and the rotating axle, between the sprocket wheels or on either side of the sprocket wheel are provided with a resilient padding.

10. The fixed radius conveyor belt system according to claim 8, wherein the drive axle and the rotating axle are conically shaped, such that the diameter of the axles closest to the turning center is smaller than the diameter of the axles furthest away from the turning center.

11. The fixed radius conveyor belt system according to claim 8, wherein the mutual angle between the axis of the drive and rotating axles is between 15° and 120°.

* * * * *